United States Patent [19]
Bode et al.

[11] 4,307,374
[45] Dec. 22, 1981

[54] INDICATOR FOR VEHICLES

[75] Inventors: Manfred Bode, Stuttgart; Rolf-Dieter Knab; Hans Prohaska, both of Bietigheim-Bissingen, all of Fed. Rep. of Germany

[73] Assignee: ITT Industries, Inc., New York, N.Y.

[21] Appl. No.: 156,470

[22] Filed: Jun. 4, 1980

[30] Foreign Application Priority Data

Jun. 6, 1979 [DE] Fed. Rep. of Germany ....... 2922910

[51] Int. Cl.³ .............................................. G08B 19/00
[52] U.S. Cl. .................................. 340/52 F; 340/519; 340/521
[58] Field of Search ................. 340/52 F, 52 R, 52 E, 340/517, 518, 519, 521

[56] References Cited

U.S. PATENT DOCUMENTS

3,964,302  6/1976  Gordon et al. .................... 340/52 F
4,035,764  7/1977  Fujinami et al. ................... 340/52 F

*Primary Examiner*—Alvin H. Waring
*Attorney, Agent, or Firm*—William T. O'Neil

[57] ABSTRACT

An electronic display indicator system for automotive vehicles wherein a single visual display unit is utilized to display the outputs of a plurality of sensing devices. The indicator system is manually activated to display the outputs of the sensor devices in sequence. Any given sensor device output is automatically displayed when the output thereof exceeds a predetermined value.

10 Claims, 19 Drawing Figures

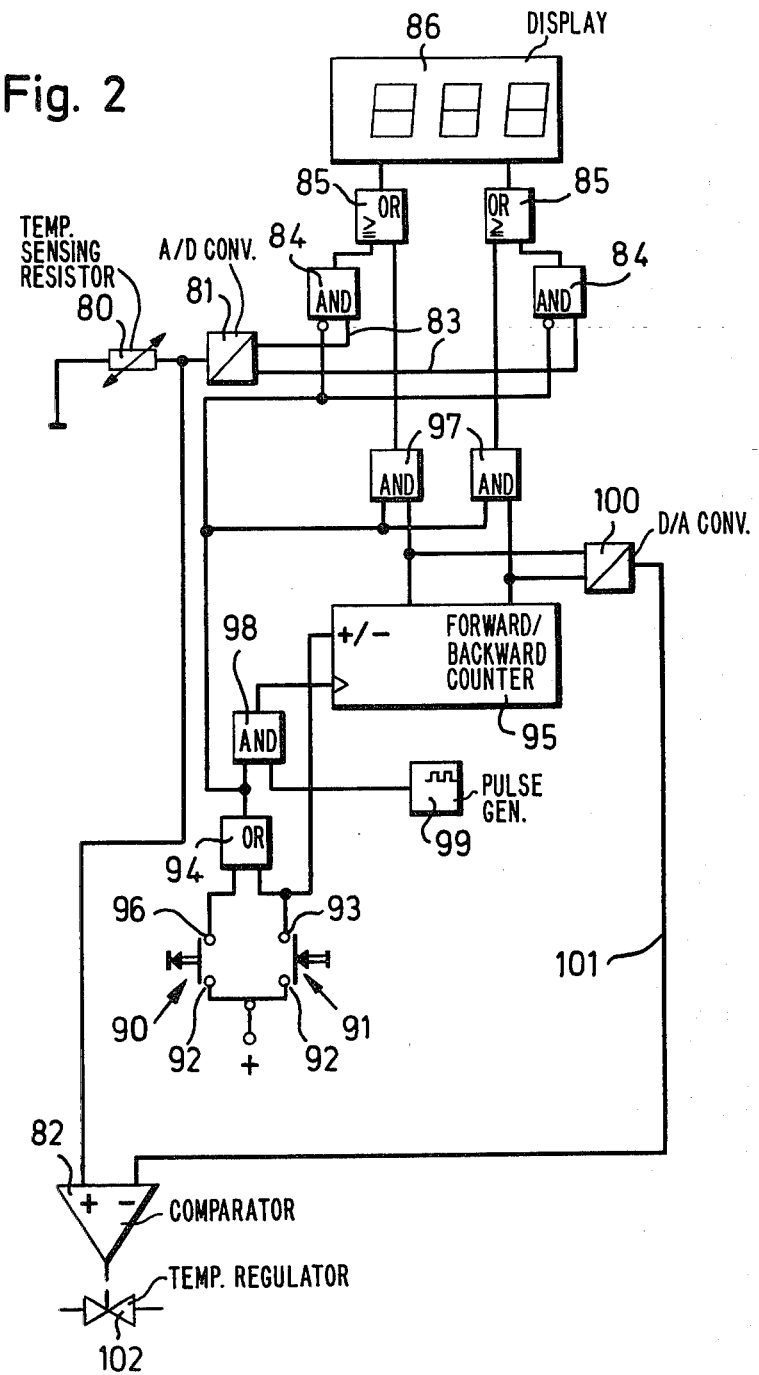

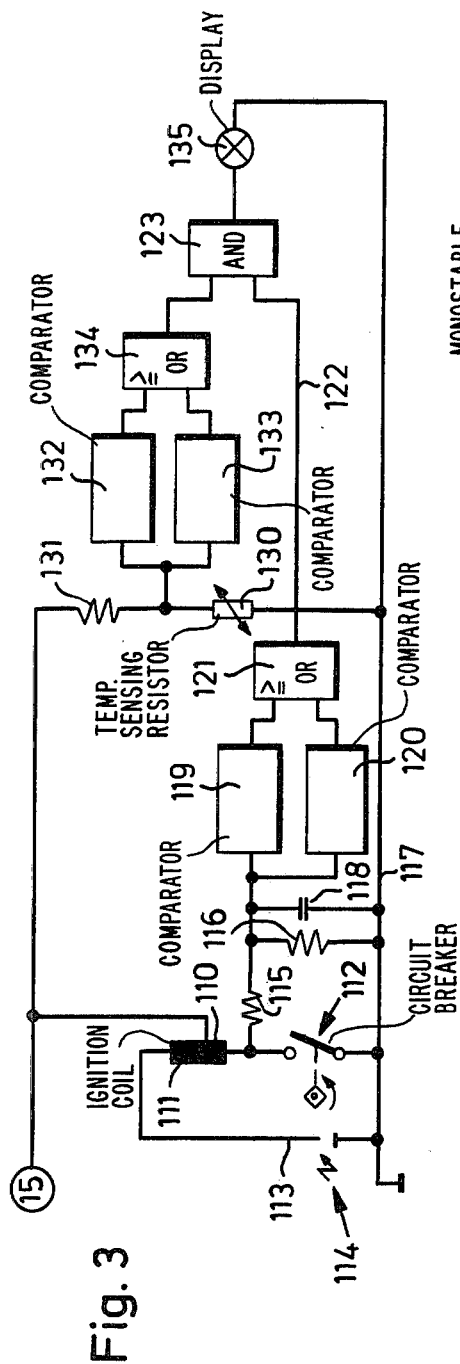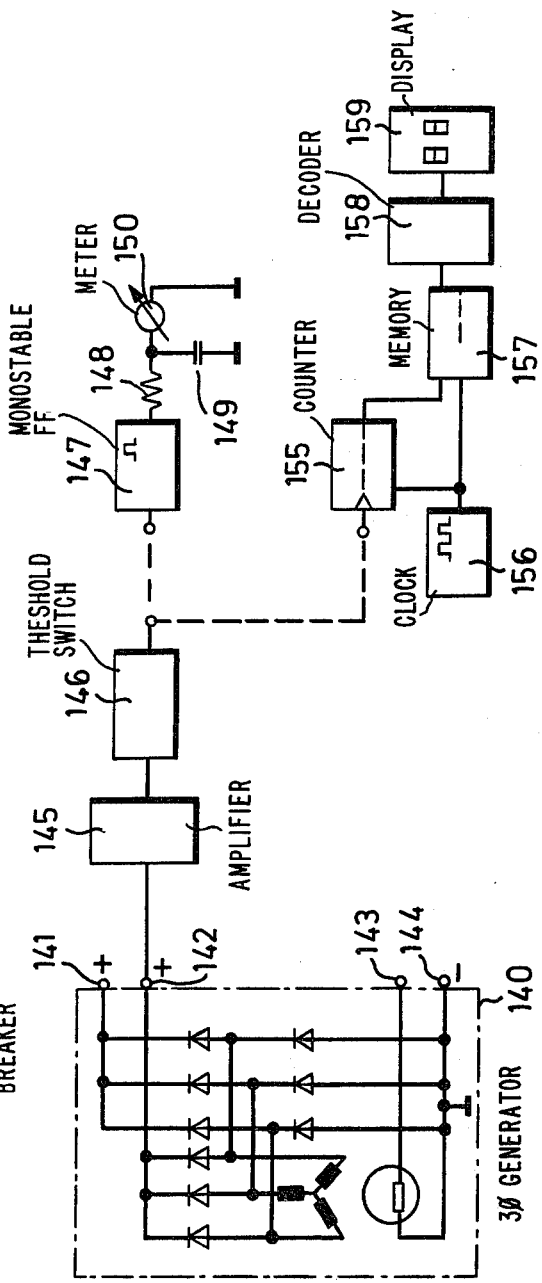

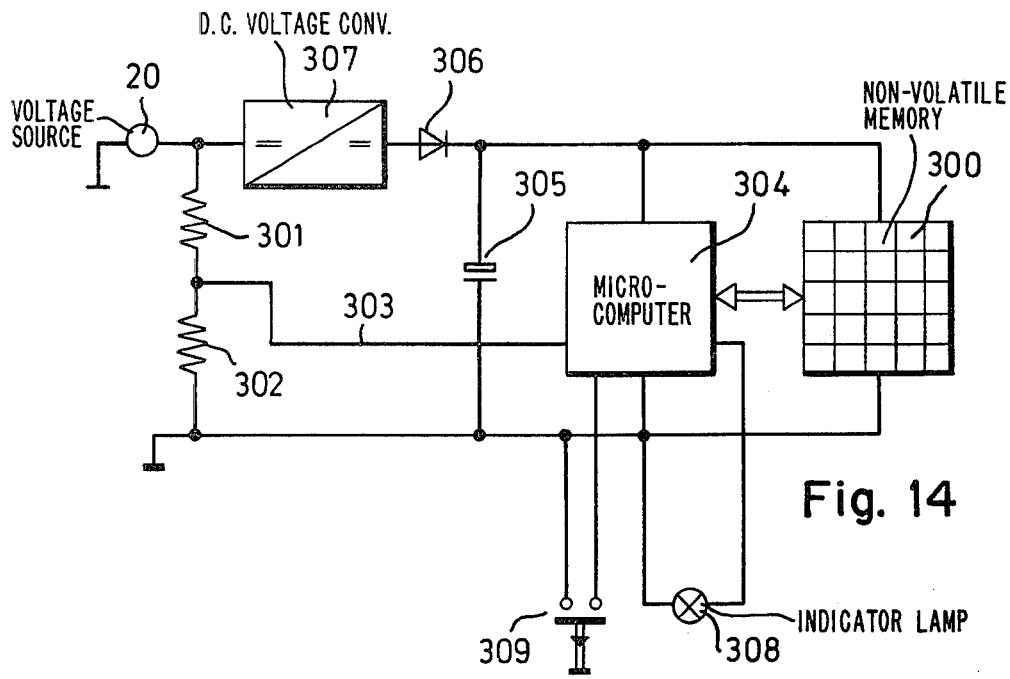
Fig. 14
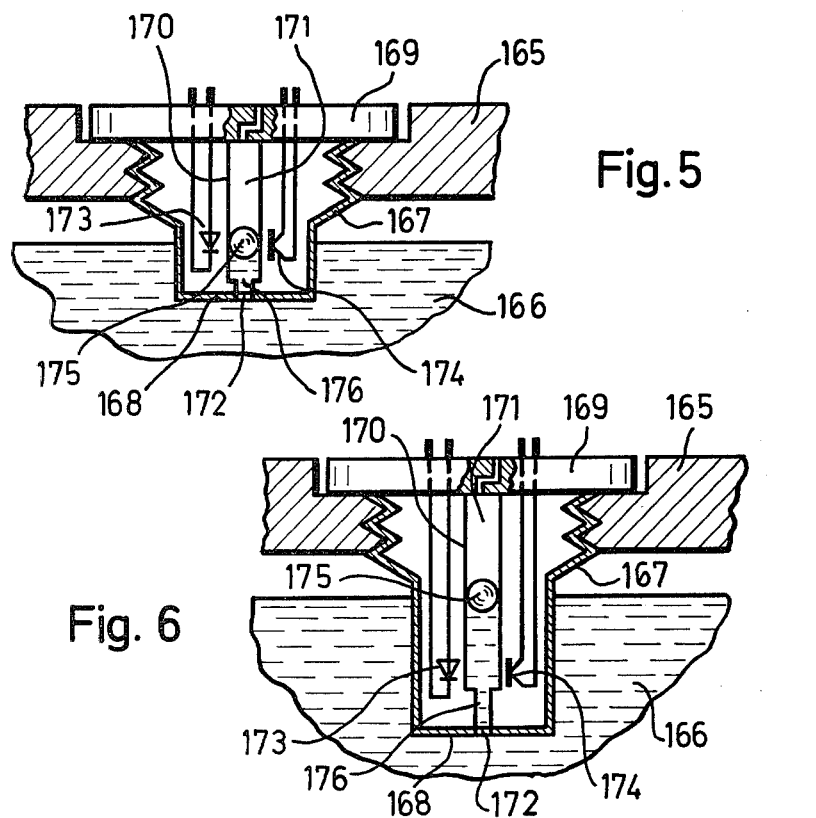
Fig. 5
Fig. 6

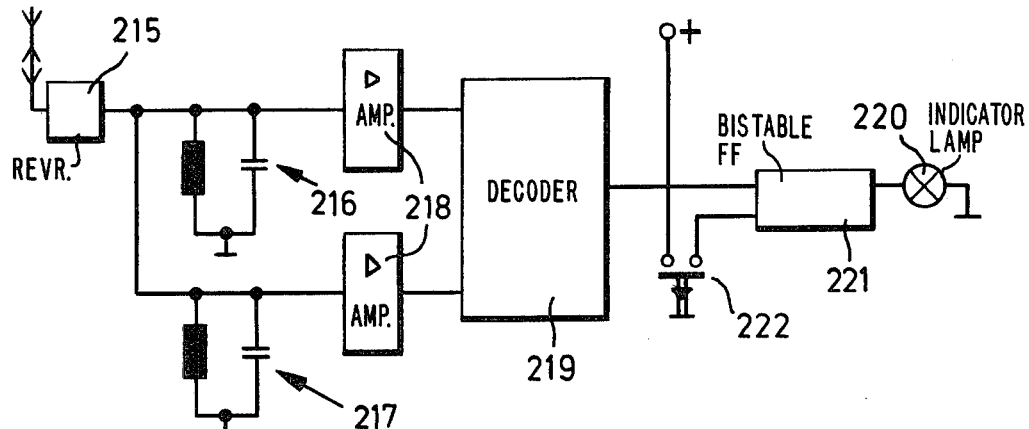
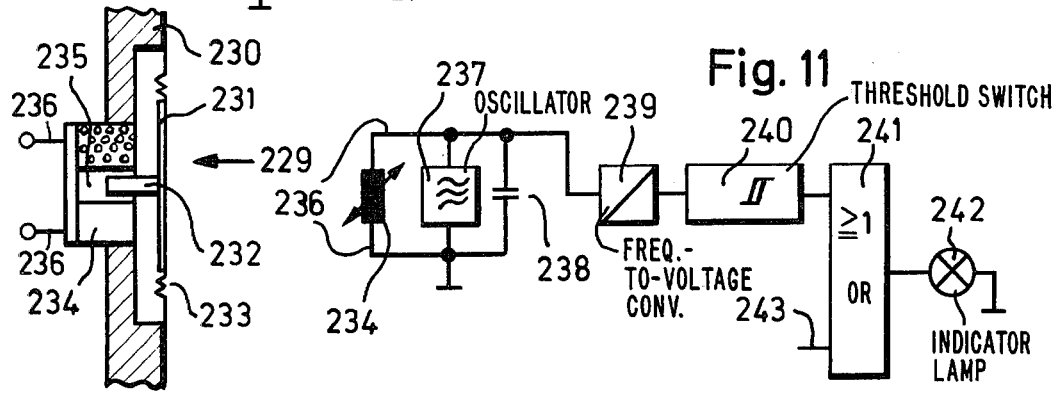
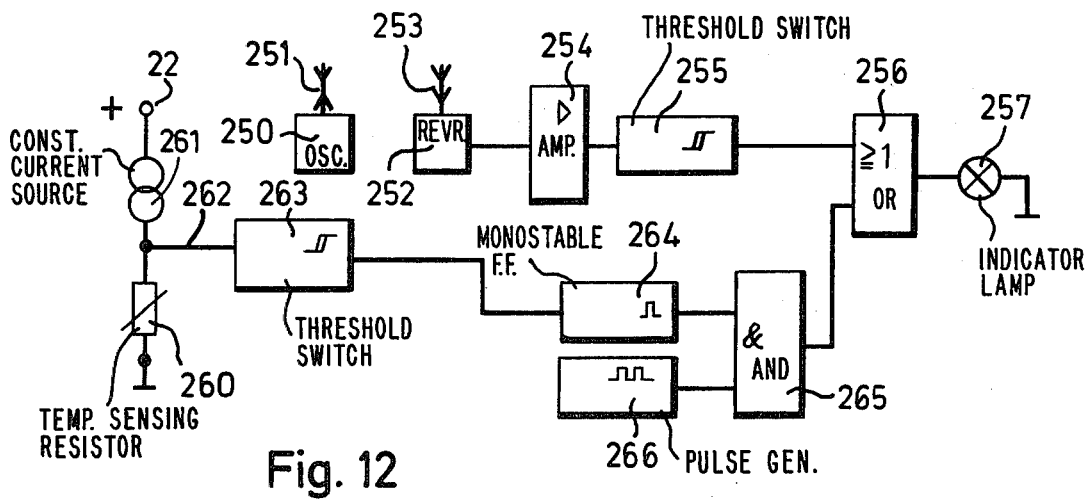

INDICATOR FOR VEHICLES

BACKGROUND OF THE INVENTION

The invention concerns an indicator having the features of the preamble of claim 1.

In order to increase driving comfort and driving safety in motor vehicles it is desirable to give to the driver as much as possible information on the condition of the individual systems in the vehicle and on outside influences affecting the vehicle during the drive. Since modern electronic development has made it possible to detect the values of inside and outside variables on and in the vehicle and to process them to signals with relatively little efforts compared to mechanical solutions, which values can be optically or acoustically indicated to the driver, indicators through which a series of functional values can be supervised are increasingly installed in vehicles.

In known indicators thereby several display panels for indication of the individual physical values are available. To each panel the indication of a given functional value is assigned. Thus as many display panels are necessary as functional values have to be supervised.

Starting from these facts it is the object of the present invention to create an indicator which is built up especially simply and distinguishes by a high functional reliability.

SUMMARY OF THE INVENTION

In the indicator according to the invention the separate functional values are fed to the display unit one after the other upon a manually released supervision of all systems monitored. This is achieved by a control unit which in addition connects through a functional value to the display unit as soon as this functional value lies not within a prescribed range. Because of this design only one display unit is necessary for all functional values.

Because the various vehicle systems should be above all supervised at the beginning of each drive in a further development of the invention it is provided that upon actuation of the ignition switch a control circuit is released. But indication during the drive too can be made possible by an additional switch.

Further advantageous aspects of the indicator according to the invention, above all of the control of the display unit, are created by measures according to dependent claims herein. If the control cycle can be interrupted at given functional values this allows to supervise how the functional value, whose control cycle has been stopped, will develop over the time.

Because some vehicle systems have not yet reached normal operating conditions, when the engine is started or shortly afterwards, thus in this phase their functional value would be indicated as faulty, it is further provided that these values can only be fed to the display unit with a time delay.

If several functional values are recognised to be faulty or if they are lying outside of the prescribed or non-critical ranges, these can appear alternately on the display unit. It is however also possible to sort the functional values according to priorities so that at any time the functional value with the highest priority is indicated.

It is also suitable, when at least a part of the functional values can be interrogated separately, so that the driver can purposefully obtain information about individual physical values of the vehicle and its surroundings.

The entire display unit can consist of many elementarily luminous points arranged in matrix form. Thereby it becomes possible to select the most important functions at any time through the control unit and to indicate them on the display unit. Thereby kind, size or form of individual indications can vary for example in dependence on up-to-dateness or priority of the functions to be indicated. It is possible too to equip most differing vehicle models with the same basic form of the display unit, whereby specific embodiments compatable with Manufacturers or models can be realised by appropriate controls.

A further embodiment is realised in that only a part of the indication consists of a freely controllable matrix, while the remaining part only contains those indications in a firmly predetermined form which have to be continuously available.

The entire display unit, possibly also the control unit and the evaluation circuits can be coated with a layer of radio noise protection lacquer in order to protect the indicator from exterior electromagnetic fields and to keep away multiplex malfunctions.

Which physical values can suitably be recognised and indicated by the indicator and in which way this can be effected simply and reliably will be understood as this description proceeds.

It is possible, that the momentary inside temperature of the vehicle is determined and indicated, a nominal temperature is predetermined and a regulating signal is derived for the regulating units of the heating or cooling circulations from the comparison between actual value and nominal value.

Monitoring of the revolutional speed of the motor and of the motor temperature is possible. Both functional values are thereby detected and examined under the concept of engine wear. Only if both are not within certain acceptable limits is a fault indicated. Of course in a simple manner also a separate control and indication of engine temperature and revolutional speed is possible.

According to further aspects of the invention, generators are provided for the indicator, which generators supervise the condition of the vehicle battery and the generator voltage, which detect outside influences on the driving behaviour like side wind, outside temperature and the nature of the road surface (especially slippery roads caused by formation of ice), or supervise the tire pressure and the thickness of the brake linings.

The tire pressure and brake lining supervision is advantageously combined to a wheel supervision. But this is only possible in a simple manner, if both the tire pressure and the brake lining supervisions are not systems supervising themselves. In case both systems should be self-supervising they are suitably conducted separately to the control and display unit.

According to other inventive concepts the indicator is advantageously developed in such a way that a clock with calendar is integrated into the indicator, that radio signals are received and their meaning can be represented on the display unit, and that for adjusting the stations on the radio the display unit shows any reception frequency reached at the time (or the channel number). Above all this is achieved by the specific development of a tuning knob. For this purpose said knob is provided with two electrically conductive surfaces which may be bridged, when they are touched with the hand. One type of handle developed in such a way that a functional value is only indicated during that time in which the handle is actuated, is however not at all restricted to the tuning knob of a radio.

By radio signals important information between individual vehicles can be exchanged. So it is, for instance, conceivable that in case of a jam or fog, drivers in front can warn drivers behind them. Thereby the transmitter advantageously transmits a characteristic succession of wave trains for the information concerned which, in order to enable a clear identification through the receiver, can have several differing frequencies. The receiver decodes the signals and the information, for instance the word "JAM", can appear on the display unit.

The electronic components of the control unit as well as the evaluation circuits of the generators are suitably combined, at least in part, in a programmable microprocessor or microcomputer. In order to provide that, in case of an interruption of the operating voltage, no important data are lost, one further development includes a non-volatile storage in which these data can be stored. The current required for this can be supplied by discharging a capacitor.

BRIEF DESCRIPTION OF THE DRAWING

The invention is described in detail by way of several embodiments shown in the accompanying drawings. The Fig. show

FIG. 2 shows a generator for indication and regulation of the inside temperature with display unit, whereby the control unit is omitted.

FIG. 3 shows a generator with indication of excessive engine wear.

FIG. 4 shows an arrangement for measuring engine rotational speed by using a voltage ripple of the three-phase generator.

FIG. 5 shows a sensor of a generator for supervision of the battery condition with interruption of a light barrier during normal battery condition.

FIG. 6 depicts a sensor similar to that of FIG. 5, however with interruption of the light barrier with bad battery condition.

FIG. 9 shows a generator which receives radio signals and processes them for indication on the displays unit.

FIG. 10 shows a sensor of a generator for indication of side wind.

FIG. 11 shows an evaluation circuit for a generator for indication of side wind.

FIG. 12 shows a generator for detecting slippery roads.

FIG. 14 is a circuit arrangement for data protection.

DETAILED DESCRIPTION

Figure 1:
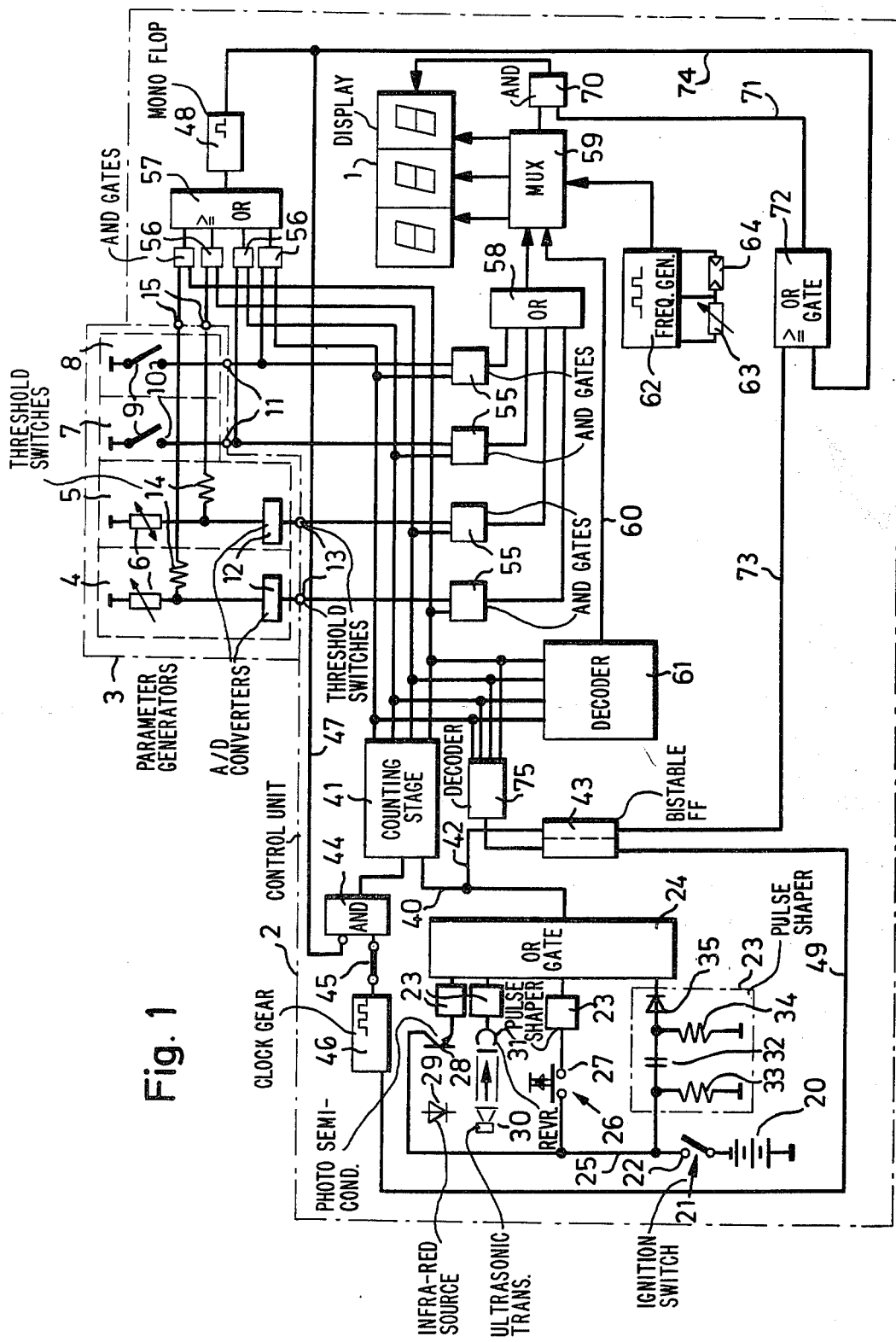
FIG. 1 depicts an indicator according to the invention with a representation of the control unit in a block diagram, several generators and the display unit in a simplified manner.

The indicator of FIG. 1 mainly consists of a display unit 1, a control unit 2 and a series of various parameter generators 3. The display unit 1 is realised by conventional seven-segment displays.

The generators are shown in a simplified manner. Two of them, 4 and 5, have components 6 on one side connected to earth and whose electrical values are variable. The size of this value, for instance of the resistor, is a measure for the size of the functional value which is to be detected by the respective generator. Thus the components 6 form the sensors of the generators 4 and 5. The generators 7 and 8 have one switch 9 as sensors each which in dependence on the size of a functional value is open or closed.

The stationary contacts 10 of the switches 9 each are directly connected to an input 11 of the control unit 2. In contrast thereto the sensors 6 of the generators 4 and 5 supplying an analogue signal are on the one hand connected to two inputs 13 of the control unit 2 through one analogue-to-digital converter 12 each and on the other hand via two threshold switches 13 each at two further inputs 15 of the control unit 2.

For the manual release of a control cycle the control unit 2 comprises several switches which are functioning on a mechanical optical or acoustical basis. To the positive pole of a voltage source 20 the ignition switch 21 is connected whose stationary contact 22 is connected with one input of the OR-gate 24 via the pulse shaper 23. Besides a lead 25 is conducted from the stationary contact 22 to a push-button switch 26 whose stationary point 27 is also connected to one input of the OR-gate 24 via a pulse shaper 23. Also, the photo-semiconductor 28 is applied to the positive pole of the voltage source 20, when the ignition switch is closed. The photo-semiconductor forms the receiver for the infrared light of the transmitter (source) 29 and is connected through in case it receives signals from the transmitter 29. As a fourth possibility for the release of a control cycle an ultrasonic transmission with the transmitter 30 and the receiver 31 is indicated. This switch can be actuated independently of the ignition switch 21. Both receivers 28 and 31 are connected to one input of the OR-gate 24 through one pulse shaper 23 each. The internal design of the pulse shaper 23 includes a capacitor 32, the two resistors 33 and 34 and the decoupling diode 35. The one side of the capacitor 32 is connected to the ignition switch 21 and applied to earth through the resistor 33, the other side is connected to one input of the OR-gate 24 through the decoupling diode 35 and applied to earth via the resistor 34.

If one of the switches 21 or 26 is closed or one of the receivers 28 or 31 receives signals, a short positive needle pulse is conducted to the OR-gate 24 through the capacitor 32, which in the first instant acts like a short circuit, and through the diode 35.

The capacitor 32 recharges via the resistor 34, so that the voltage on the resistor 34 is rapidly reduced. When the recharging operation is terminated the respective input of the OR-gate 24 is again applied to earth. If the actuated switch is opened, the capacitor 32 can discharge via the resistor 33. Besides the embodiment shown of course also a monostable flip-flop can be used as a pulse shaper.

The output of the OR-gate 24 is connected to a counting stage 41 via the lead 40, which counting stage is realised by a shift register. The output of said OR-gate is furthermore connected to the set input of a bistable flip-flop 43 through the lead 42. The clock input of the shift register 41 is controlled by the output of the AND-gate 44 which with a non-inverting input is connected to the output of the clock generator 46 via a switch 45 and with an inverting input to the output of the monoflop 48 via the lead 47. The clock frequency of the clock generator 46 is dependent on the condition of the flip-flop 43 via the control lead 49.

Each parallel output of the shift register 41 is connected to one input each of two AND-gates 55 and 56. The two AND-gates which are connected to the same output of the shift register 41 are controlled by generators 4, 5, 7 and 8, both AND-gates by the same generator. The generators 4 and 5 conduct their signals to two AND-gates 55 through the analogue-to-digital converters 12 and to two of the AND-gates 56 through the two threshold switches 14. The generators 7 and 8 are connected in the same manner to two AND-gates 55 and two AND-gates 56.

Between the outputs of the AND-gates 56 and the output of the monoflop 48 the OR-gate 57 is connected. The outputs of the AND-gates 55 however are via the OR-gate 58 connected to the multiplexer (MUX) 59 operating the display unit 1. The decoder 61, which is controlled by the parallel outputs of the shift register 41 and in line with the functional values connected through to the display unit 1 via an open gate 55 or 56 each by a generator 4, 5, 7 or 8 conducts symbols, characters or words to the multiplexer 59 for indication on the display unit 1, is also connected with the multiplexer 59 via the lead 60.

The multiplexer 59 is operated by the frequency generator 62 whose pulse/no pulse ratio can be manually regulated by the variable resistor 63 or automatically by means of the photosemiconductor 64 for example in dependence on the brightness of the surroundings.

The display unit 1 is controlled for indication, when a positive signal appears at the output of the AND-gate 70 which is connected to the display unit 1. The inputs of the AND-gate 70 are connected to one output of the multiplexer 59 and via the lead 71 to the output of the OR-gate 72, at which a positive signal appears, when the flip-flop 43 or the monoflop 48 conduct a positive signal to one of the two gate inputs via the lead 74.

The flip-flop 43 which is set by a positive signal at the output of the OR-gate 24 is reset as soon as a control cycle is terminated. This can be realised in that the reset input is connected to a further output of the shift register 41. More generally, it is also possible that, as it is shown in the drawing, a decoder 75 interrogates the count at the outputs of the counting stage 41 and resets the flip-flop 43 after a control cycle.

When the ignition is switched on, the push-button switch 26, the infrared transmission path or the ultrasonic transmission path for the described indicator are actuated, at the output of the OR-gate 24 a short needle-pulse appears through which the flip-flop 43 is set and the shift register 41 reaches its defined initial position. At the same time the clock generator 46, controlled via the lead 49, is changed over to a lower frequency. Such a release would also be possible, if a single pulse shaper 23 were looped in behind the OR-gate 24. This would, however, entail the disadvantages, that an indication cycle could no longer be directly released via the ignition switch 21 and not via a further switch, if a second switch is also acted upon.

The set flip-flop 43 enables an indication control of the display unit 1 via the OR-gate 72 and the AND-gate 70, so that the functional values of the generators 4, 5, 7 and 8, which one after the other are switched through the AND-gates 55 by the shift register 41, together with their symbols appear on the display unit 1 for a time corresponding to a period of the clock generator 46. When the last measured value was indicated the decoder 75 connects through and resets the flip-flop 43. Thereby the display unit 1 goes out and the clock 46 changes over to a higher frequency.

The switch 45 makes it possible to interrupt an indication cycle at a given functional value and to supervise the development of this value over the time. For this purpose the switch 45 is opened, so that the pulses of the clock generator can no longer reach the shift register 41.

After the end of an indication cycle the shift register 41 is continued to be triggered by the generator 46 and cyclically controls the AND-gates 55 and 56. But because the display unit 1 is not supplied with current, no functional values appear on it.

If however one of the functional values is not within a given range the appropriate gate 56 is opened, when the shift register 41 controls said gate. The output of the OR-gate 57 thereby changes its voltage level and tilts the monoflop 48 into its instable condition. Said monoflop effects during its pulse time via the lead 47 that the gate 44 is blocked and via the lead 74, the OR-gate 72, the lead 71 and the AND-gate 70 that the display unit is switched on. The functional values available at the multiplexer 59 via one of the AND-gates 55 and the OR-gate 58 thus appears on the display unit during the pulse time of the monoflop 48.

The monostable flip-flop 48 is triggered once with each counting period. Thereby the through-connection is effected so rapidly because of the higher frequency that for the human eye a standing indication of the defect comes into being.

If two or more limit values are exceeded at the same time these are automatically indicated in the display unit 1 one after the other for the pulse time of the monoflop 48 until the corresponding troubles are cured again.

In FIGS. 2 to 13 and 15 to 19 various generators with their sensors and mostly with an evaluation circuit are shown. In FIGS. 2, etc. one display each is provided which indicates that the generators according to the invention can also advantageously be separately used. However these generators can be also connected to the control unit of FIG. 1 in a simple manner.

FIG. 2 shows a generator by which the temperature in the vehicle can be regulated. A variable resistor 80 is connected to earth on one side. The resistance value of the resistance 80 is a measure for the temperature in the vehicle interior. The second side of the resistor 80 is connected to the analogue-to-digital converter 81 and to the comparator 82. The outputs of the analog-to-digital 81 converter conduct the digital signal via the leads 83 to corresponding inputs of the AND-gates 84, whose outputs are connected to the display unit 86 via OR-gates 85.

For adjusting the nominal value, the generator has two pushbutton switches 90 and 91, of which a stationary contact 92 of each has positive potential from a voltage source. The stationary contact 93 of the switch 91 is connected with one input of the OR-gate 94 and with the changeover input of the forward-backward counter 95, the stationary contact 96 of the switch 90 only to the second input of the OR-gate 94. The output of the OR-gate 94 on the one hand is connected to the respective inverting input of AND-gates 84, on the other hand to an input of the AND-gate 98. The AND-gate 98 switches the pulses of the pulse generator 99 through to the forward-backward counter 95, while via the AND-gates 97 the count of the counter via the OR-gates 85 may be conducted to the display unit 86.

Moreover, the count of the counter 95 is transformed to an analogue signal by the digital-to-analogue converter 100, which signal is conducted to the comparator 82 via the lead 101. In dependence on the potential available at the output of the comparator 82 the regulating units 102 can then be actuated.

If neither of the switches 90 or 91 is activated, the output of the OR-gate 94 has a low potential. Thereby the AND-gates 97 and the AND-gate 98 are blocked, whereas the AND-gates 84 are opened. Therefore the actual value of the temperature detected by the resistor 80 is indicated. The nominal value of the temperature stored in the counter 95 is equal to the actual value.

If now the temperature is to be increased or reduced either the key 90 or the key 91 is pressed. The output of the OR-gate 94 becomes positive, so that the AND-gates 84 block, whereas the AND-gate 98 connects through the pulses of the generator 99 to the forward-backward counter 95. The AND-gates 97 are opened as well, so that the momentary count of the counter appears on the display unit. In dependence on whether the key 90 for temperature reduction or the key 91 for temperature increase is pressed, the counter 95 subtracts or adds up the pulses of the generator 99. Thereby the count of the counter 95 can be observed on the display. If the pressed key 90 or 91 is released, a new nominal value is predetermined. Said nominal value is conducted via the digital-to-analogue converter 100 to the comparator 82 which compares it to the nominal value and gives appropriate commands to the regulating units 102. When both switches 90 and 91 are open the actual value of the temperature appears again on the display unit 86.

The generators of the FIG. 3 and 4 have sensors, by which the rotational speed of a motor can be detected. The generator of FIG. 4 thereby has the purpose of supplying signals which allow an indication of the rotational speed of the motor. By the generator of FIG. 3 the motor temperature is supervised at the same time. In this case a signal may only be conducted to the display unit, if both revolutional speed of the motor and motor temperature are not within a given range.

The primary winding 110 and the secondary winding 111 of an ignition coil are connected to the terminal 15 at one end. The second end of the primary winding 110 is applied to earth via the circuit breaker 112, whereas the second end of the secondary winding 111 may be connected to the center electrode 113 of the available ignition plugs, typically 114.

Between the primary winding 110 and the circuit breaker 112 a lead is branched in which the resistors 115 and 116 are looped, whereby the resistor 116 is connected with the earthing connection 117. The capacitor 118 is connected in parallel to the resistor 116.

The voltage at the capacitor 118 is conducted to the inputs of two comparators 119 and 120 with switching hysteresis, of which the one, e.g. 119, supervises the upper threshold value and the other, 120, supervises the lower threshold value of the rotational speed. Thereby the switching hysteresis prevents the respective comparator 119 or 120 from continuously changing over, when the rotational speed only varies slightly around one of the two threshold values. With the outputs of the comparators (threshold switches) 119 and 120 two inputs of the OR-gate 121 are controlled whose output signal is conducted to an input of the AND-gate 123 via the lead 122.

The motor temperature is detected by the variable resistor 130 which together with the resistor 131, which is stable to a great extent, forms a voltage divider between the terminal 15 and the earthing connection 117. Between the resistors 130 and 131 a potential for the inputs of the two comparators 132 and 133 is tapped off. Comparators 132 and 133 operate in the same way as the comparators 119 and 120 and supervise the limit values of the temperature. The outputs of the two comparators are again connected to two inputs of an OR-gate 134, whose output signal controls a second input of the AND-gate 123. Between the output of the AND-gate 123 and the earthing connection 117 the display 135 is inserted.

As soon as the potential tapped off from the voltage divider 130/131 indicates that a limit value of the temperature is exceeded one or the other of the two threshold switches 132 and 133 changes over in dependence on whether the upper or the lower limit value is concerned, so that via the OR-gate 134 a signal is conducted to an input of the AND-gate 123. However the display 135 is only lighted up, if also the second input of the AND-gate 123 receives a positive signal. This occurs, if the number of the ignition pulses per time unit, which are reduced in amplitude by the voltage divider 115, 116 and integrated by the capacitor 118, is so small or so big that one of the two comparators 119 or 120 changes over.

Thus the display 135 denotes that both the rotational speed and the motor temperature are not within given ranges. Of course it is indeed possible by the outputs of the OR-gate 121 or 134 one indication each is controlled, and it is then possible additionally to supervise rotational speed and temperature separately.

Using the sensor of FIG. 4 the rotational speed of a motor is detected via the voltage ripple of a known and existing three-phase generator 140 in the vehicle. The three-phase generator has a total of four terminals 141, 142, 143 and 144. The terminal 141 is applied to the positive pole of a battery (not shown in the drawing), the terminals 142, 143 to 144 are connected to a control. To the terminal 142 an amplifier 145 is connected which conducts its initial voltage to a threshold switch 146 which forms rectangular pulses from the ripple of this voltage. Now the evaluation of these pulses may either be analog or digital.

When the measuring is analogue the output signals of the threshold switch 146 are conducted to the monostable flip-flop 147 at whose output a low-pass filter including the resistor 148 and the capacitor 149 is connected as an integrator. In parallel with the capacitor 149, a moving-coil meter 150 is connected, which indicates the integrated and time-constant output pulses of the monostable flip-flop 147, whose number per time unit is a measure for the rotational speed.

When the measuring is digital the output of the threshold switch 146 is connected with the counter 155. The reset input of the counter 155 is controlled by the clock generator 156, which additionally, at the end of each cycle, opens the memory 157 to read in the count of the counter 155. The information contained in the memory 157 is conducted to the display unit 159 via the decoder 158 which transforms the count of the counter into the rotational speed. Thereby the information in the memory is available for one cycle of the clock generator each and is then substituted for the latest count of the counter.

The FIGS. 5 and 6 each show a sensor for a generator supervising the condition of a battery. In these figures the cover 165 and the acid bath 166 of the battery are partly to be seen. The threaded stopper 167 is screwed into an opening of the cover. Said stopper has a hollow interior and is partly submerged into the acid bath 166.

At the bottom 168 and at the cover 169 of the stopper 167 a pipe 170 is attached which consists of transparent material and whose interior is in connection with the acid bath 166 through an opening 172 in the bottom in the manner of a communicating pipe. By the light-emitting diode 173 and the photo-semiconductor 174 arranged on opposite sides of the pipe 170 a light path is formed which may be interrupted by the ball 175 floating in the interior 171 of the pipe 170 on the acid bath surface. In dependence on the level and density of the acid bath 166 the position of the ball 175 in the pipe 170 changes. In downward direction the movement of the ball 175 is limited by a throat 176 of the pipe 170.

In the embodiment of FIG. 5 the ball 175 is located at the same level as the light-emitting diode 173 and the photo-semiconductor 174 and thereby interrupts the light path, if the battery is in proper condition. If the level of the acid bath 166 is lowered the ball 175 sets free the light beam to the photo-semiconductor. The weight of the ball 175 can be selected in such a way that the ball is lowered too, when the percentage of the acid in the acid bath 166 is reduced below a minimum value. The specific gravity of the acid bath is, of course, dependent on the acid concentration. If this specific weight falls below a given value the ball 175 will no longer be able to float and falls down to the throat 171, even if the level of the acid bath remains the same.

When the range, in which a proper battery condition is indicated, is to be bigger than that of the sensor according to FIG. 5, the similarly built up sensor of FIG. 6 can be used. There the light path is not interrupted in normal condition, because the light-emitting diode 173 and the photo-semiconductor 174 are below the liquid level. A signal appears only in case the ball 175 is lowered to the height of the light path together with the surface of the acid bath which height equals to the minimum filling height. The throat 176 prevents the light barrier from being again set free, when the liquid level is lowered further. Also in case the smallest admittably specific gravity is not reached the ball 176 is held at the height of the light barrier by the throat 176.

The range in which the level of the acid bath 166 is to be located can also be broadenend in comparison to that of FIG. 5 by using an elongated body instead of a ball. Said body would be located with its upper end just below the light path when the smallest still admittable level is reached. Accordingly the stopper 167 must submerge deeper into the acid bath 166 than in FIG. 6.

Figure 7:
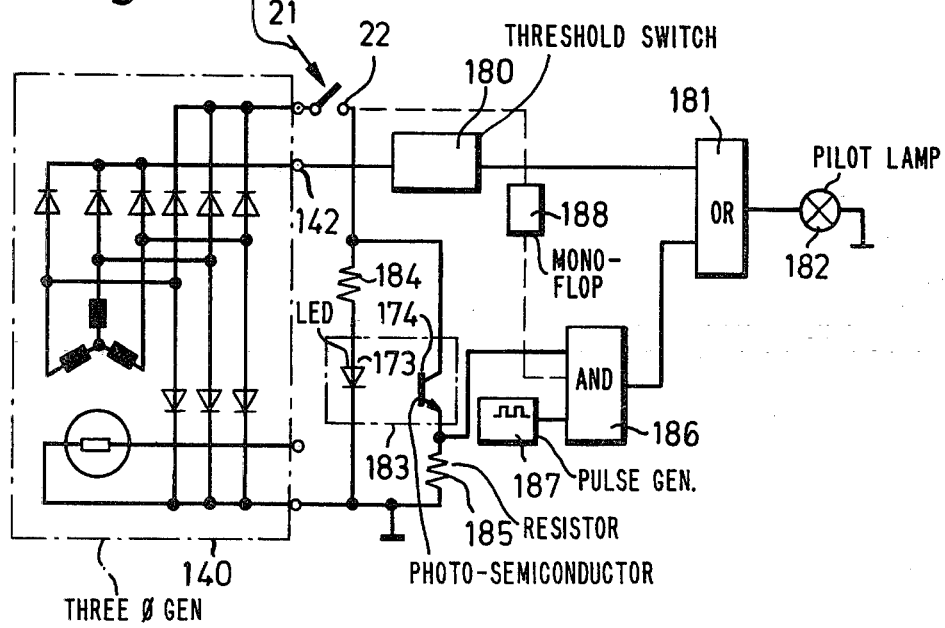
FIG. 7 is an evaluation circuit of a generator with a sensor according to FIG. 5 with simultaneous supervision of the generator voltage.

FIG. 7 shows a generator with a sensor according to FIG. 5. At the same time the generator voltage is supervised by the generator of FIG. 7. For this purpose the input of a threshold switch 180 with switching hysteresis is connected to the output 142 of the three-phase generator 140. The threshold switch in turn conducts its output signal to an input of the OR-gate 181 which controls the pilot lamp 182.

For supervision of the battery condition one electrode of the light-emitting diode 173 is connected through the resistor 184 and one electrode of the photo-semiconductor 174 is connected directly to the stationary contact of the ignition switch 21, whereas the second electrode of the light-emitting diode 173 is directly applied to earth and the second electrode of the photo-semiconductor 174 via the resistor 185. A potential tapped off between the resistor 185 and the photo-semiconductor 174 is conducted to one input of the AND-gate 186 a second input of which is controlled by the pulse generator 187. The output signal of the AND-gate 186 is connected through to the pilot lamp via the OR-gate 181.

Because during the drive overflowing acid may cause faulty indications one can, as it is indicated by dotted lines, insert a monoflop 188 between the stationary contact 22 of the ignition switch 21 and one input of the AND-gate 186. Said monoflop is triggered; when the ignition switch 21 is closed. As soon as this flip-flop again reaches its stable condition the AND-gate 186 is blocked. Thus supervision of the battery is only possible during the pulse time of the monoflop 188.

If the ball 175 of FIG. 5 is located between the light-emitting diode 173 and the photo-semiconductor 174, and the battery is in order, the semiconductor is blocked, so that between it and the resistor 185 nearly earth potential is tapped off.

Figure 8:
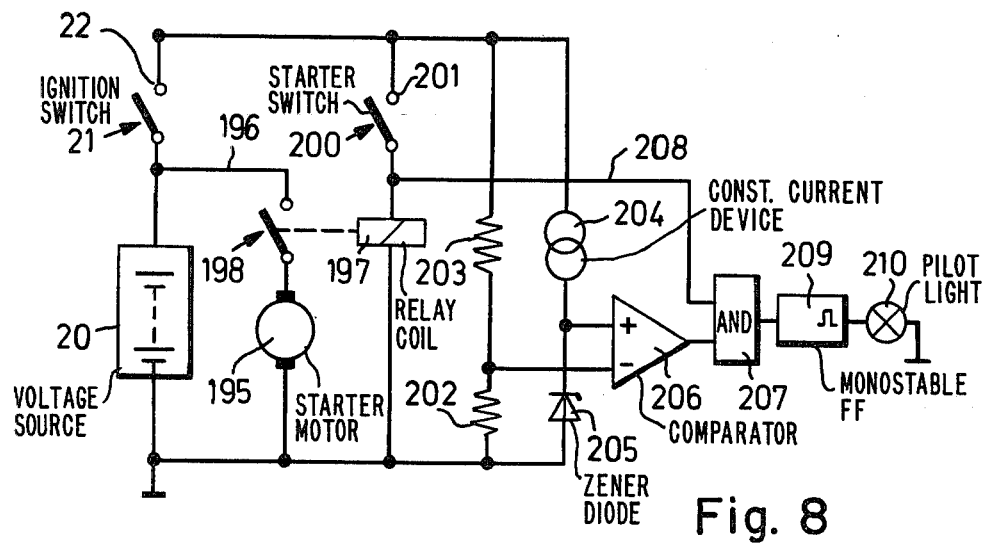
FIG. 8 shows a generator for electronic battery supervision at the time the battery is loaded by the starter motor.

Therefore the AND-gate 186 blocks. If, however, the light path is not interrupted, the tapped-off, potential becomes positive and the pulses of the generator 187 reach the lamp 182 which indicates a battery defect by flashing. If the monoflop 188 is available the lamp 182 only flashes during the pulse time of this monoflop. Constant light of the pilot lamp 182 indicates a defect of the three-phase generator 140. FIG. 8 shows a further possibility for an electronic battery supervision with display. Thereby the battery voltage is measured when the battery is loaded by the starter motor 195, because voltage measurements on a little loaded battery do not indicate its loading condition.

The ignition switch 21 is connected to the positive pole of the voltage source 20. Before the ignition switch a lead 196 is branched to a magnetic switch 198 operated by a relay coil 197. Through said magnetic switch the starter motor 195 can be supplied with voltage and said switch is connected to earth with its second terminal. The starter switch 200 is series connected with the relay coil 197. The make contact 201 of said starter switch is connected to the stationary contact 22 of the ignition switch 21.

In parallel each with the starter switch and the relay coil a voltage divider consisting of the resistors 202 and 203 and the series connection of a constant current source 204 and a Zener diode 205 supplied from this voltage source are connected. One potential each is tapped off between the resistors 202 and 203 as well as the between the Zener diode 205 and the constant current source 204 which is conducted to the inputs of a comparator 206. The output of the comparator 206 is connected with an input of the AND-gate 207 for the second input of which a potential is tapped off between the relay coil 197 and the starter switch 200 through the lead 208. The monostable flip-flop 209 during the pulse time of which the lamp 210 lights up is triggered by a positive signal at the output of the AND-gate 207.

After the ignition was switched on via the ignition switch 21 and by actuating the starter switch 200 the relay coil 197 is supplied with current and, after the switch 198 closes the starter 195 is activated.

At the same time during the starting operation the AND-gate 207 sets free the initial voltage of the comparator 206, so that the lamp 210 is controlled during the pulse time of the flip-flop 209, when a given minimum voltage is not reached. The comparator 206 compares the battery voltage stepped down with the voltage divider to a nominal voltage which comes into being at the Zener diode 205 supplied from the constant current source 204.

With a generator according to FIG. 9 radio signals can be received and processed in such a way that they may be recognised as hints for the passengers on a display. This generator has a receiver 215. From the signals received the two frequences with which the transmitter operates are filtered out by two oscillatory circuits 216 and 217. The natural frequency of the one oscillating circuit is thereby tuned to the one marker frequency, that of the second oscillating circuit to the other marker frequency. The two marker frequencies are simplified by the two amplifiers 218 and conducted to a decoder 219. Said decoder transforms the succession of wave trains varying in a defined manner and composed of one each of the two frequencies into signals for the display unit 220. In case the decoder 219 has recognised an indication, the bistable flip-flop 221 is set and the display 220 is lighted up. A positive signal can be switched to the reset input of the flip-flop 221 by the key switch 222. Said flip-flop 221 thereby is reset back to its first condition and the indication goes out.

A further embodiment of a generator which is shown in the FIGS. 10 and 11 serves for detection of the side wind acting upon the vehicle. FIG. 10 shows the sensor 229 of said generator which is located in a lateral part of the vehicle body 230. Said sensor consists of a plate 231 carrying a core 232 directed to the interior and movably suspended on the body 230 facing tansversely to the vehicle axis by means of a rubber bead 233. Behind the plate 231 in an opening of the sheet metal 230 a coil 234 is fixed whose central hollow space 235 is arranged in elongation of the core 232. In dependence on the pressure from outside caused by the side wind and acting on the plate 231 the core 232 intrudes more or less deeply into the interior 235 of the coil 234 so that the inductivity of the latter changes.

FIG. 11 shows an oscillator 237 and a fixed capacitor 238 connected in parallel to the coil 234. The coil and the capacitor form an oscillating circuit. The frequency with which this oscillating circuit oscillates is converted to a voltage by the frequency-to-voltage converter 239. The initial voltage of the converter 239 is conducted to a threshold switch 240 with switching hysteresis, which with its output controls the display 242 via the OR-gate 241. The lead 243 which is connected to a second input of the OR-gate 241 indicates that also on the other side of the vehicle the side wind is supervised by a corresponding arrangement.

The frequency of the oscillating circuit consisting of the coil 234 and the capacitor 238 changes with the coil inductance which itself is dependent on the side wind. As soon as this voltage and thus the side wind exceeds a given limit value the threshold switch 240 changes over, so that the display 242 lights up. Thereby the display indicates side wind, independently of the direction from which it comes. It is however also conceivable to indicate also the direction from which the side wind is coming by controlling the display 242 in a different manner or by using two indicator lamps.

The generator of FIG. 12 serves to detect whether the road is slippery as with ice. For this purpose in a suitable place on the bottom of a vehicle there are arranged u.h.f. oscillator 250 with directional aerial 251 and a receiver 252 including the antenna 253 tuned to the same frequency. To the receiver 252 an amplifier 254 is connected which a threshold switch 255 with switching hysteresis is following. The output of the threshold switch 255 is connected to one input of the OR-gate 256, which controls the display with its output.

Depending on the condition of the road the share of the transmitting energy of the oscillator 250 which is received by the receiver 252 is bigger or smaller. The following amplifier 254 and the threshold switch 255 are processing the signal suitably. If the intensity of the signal reaches a given threshold value, the display 257 lights up.

A further sensor with appropriate evaluation of its temperature-dependence is provided for an early warning in case of low outside temperature. A temperature-dependent resistor 260 serves as a sensor. Said resistor is supplied from a constant current source 261 which is connected to the stationary contact 22 of an ignition switch (not shown in detail). At the resistor 260 a voltage is tapped off and conducted via the lead 262 to a threshold switch 263 with switching hysteresis. Upon changing over the threshold switch triggers a monostable flip-flop 264 whose output is connected to an input of the AND-gate 265. To the second input of the AND-gate 265 a pulse generator 266 is connected. The potential at the output of the AND-gate is connected through to the display 257 via the OR-gate 256.

If the temperature already has fallen below the given limit value before the drive has begun or falls below this limit value during the drive, with closed ignition switch, the voltage drop has such a value as to induce the threshold switch 263 to change over and to trigger the monoflop 264. During the pulse time of the monoflop 264 the AND-gate 265 is open for the pulses of the generator 266. Therefore the lamp 257 flashes during the pulse time of the monoflop 264, while it radiates constant light upon control through the threshold switch 255.

Figure 13:
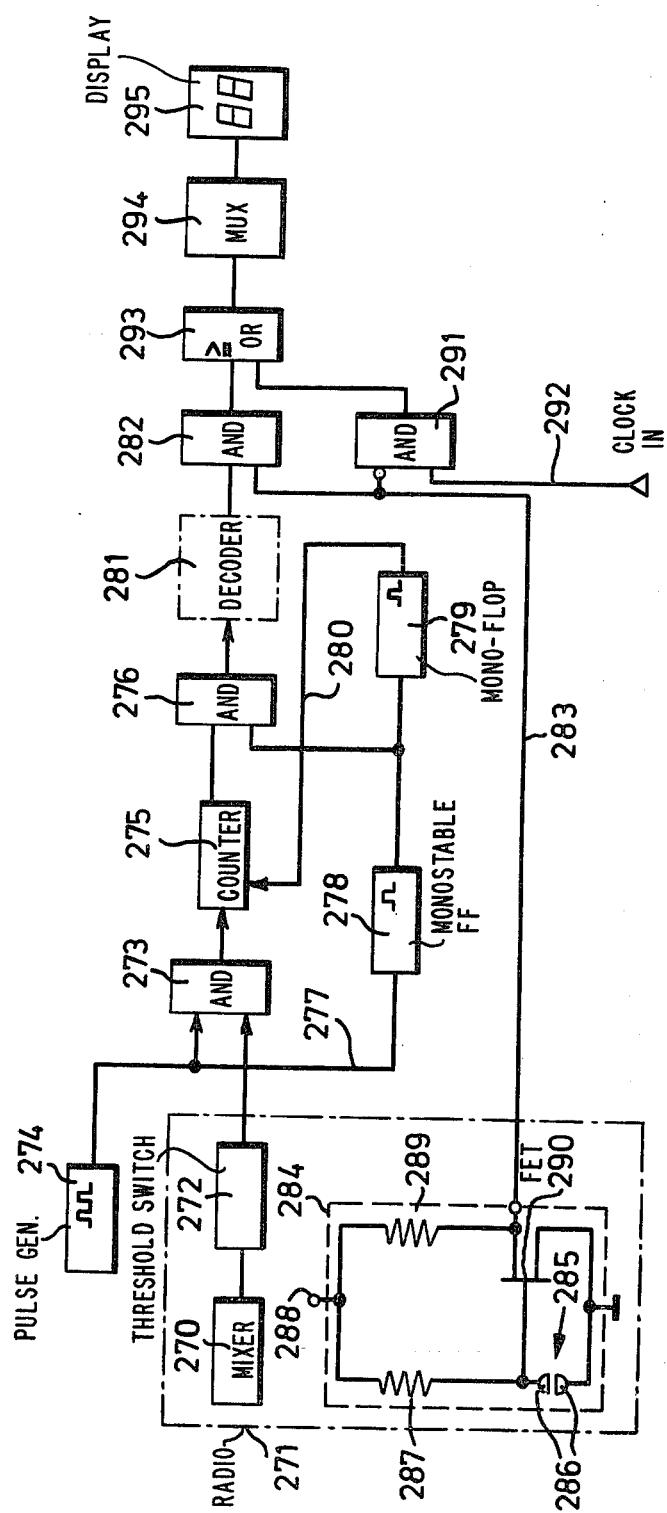
FIG. 13 is a generator detecting the radio frequency.

In FIG. 13 a generator with evaluation circuit is shown which, when the radio station is sought, indicates the reception frequency adjusted or passed at the time represented in a digital manner.

A mixer section 270 in the radio 271 produces pulses with reception frequency by the difference between oscillator and intermediary frequencies. Said pulses are processed in the following threshold switch 272. The output of said switch 272 is connected to one input of the AND-gate 273, whose second input is controlled by the pulse generator 274. The pulses incoming via the AND-gate 273 are counted by a counter 275 whose output is connected to one input of the AND-gate 276.

The monostable flip-flop 278 is triggered via the lead 277 by the falling edge of a pulse of the generator 274. The output of said flip-flop is connected to the AND-gate 276 and to the monoflop 279. The output of the monoflop 279 is connected to the reset input of the counter 275 via the lead 280. The output of the gate 276 is connected to the input of a third AND-gate 282, if desired by inserting a decoder 281 shown in dash-dotted lines, which decoder assigns channel numbers to the reception frequency values counted. Said gate 282 is opened via the lead 283 and an electronic circuit 284 by the transmitter tuning knob 285, which has two conductive surfaces 286 being bridged, when the knob is touched by a hand.

The one surface 286 is connected to the positive pole 288 via a resistor 287, the other surface 286 is connected to earth. The resistor 289 and the drain-source path of the FET 290 are series connected and switched in parallel to the resistor 287 and to the surfaces 286. The gate electrode of the FET 290 is connected to the potential between the transmitter tuning knob 285 and the resistor 287. The lead 283 taps off the potential between the resistor 289 and the FET 290.

Through said lead in addition to the AND-gate 282 also the AND-gate 291 is controlled which, if the potential is positive, blocks the signals conducted on the lead 292, e.g. coming from a clock. The output signals at the two AND-gates 282 and 291 are via the OR-gate 293 conducted to the multiplexer (MUX) 294 which controls the display unit 295.

During the time of a positive pulse of the generator 274 the gate 273 is open, so that the counter counts the pulses coming from the threshold switch 272 in that time. The counting is terminated with the falling edge of a generator pulse, because from that time the gate 273 is blocked. At the same time the monoflop 278 is triggered, so that its output becomes positive and the AND-gate 276 connects through the count of the counter to the decoder 281 and to the AND-gate 282. In case both surfaces 286 of the tuning knob 285 are bridged, the AND-gate 282 is open. The reception frequency or the channel number can appear on the display unit 295. As soon as the monoflop resets again the gate 276 is closed.

The monoflop 279 is triggered which resets the counter 275. This is effected between two pulses of the generator 274. With the following generator pulse the counter begins to count from the beginning.

As long as the transmitter tuning knob 285 is touched, that means the AND-gate 282 remains open for the current count of the counter at the end of a generator pulse, the reception frequency or the channel number is indicated. If the desired station has been adjusted and the transmitter tuning knob has been released the AND-gate 282 is blocked, while the AND-gate 291 is opened. Therefore the time or another functional value appears on the display 295 which is conducted to the AND-gate 291 via the lead 292.

The arrangement according to FIG. 14 serves the purpose of storing temporarily important data information on a non-volatile secondary memory 300, when the operating voltage is interrupted. Said secondary memory can for, instance, consist of a matrix of ferrite rings (magnetic loops) which, as it is known, are able to store digital information over an unlimited time without receiving supply voltage. The circuit shows a voltage divider consisting of the two resistors 301 and 302 which is applied to the voltage source 20. Between the two resistors a voltage is tapped off which via the lead 303 advises an available operating voltage to the microcomputer 304. The capacitor 305, which is decoupled from the remaining network by the diode 306, is also connected to the poles of the voltage source 20 via the d.c. voltage converter 307. To this converter the microcomputer 304 and the memory 300 are connected in parallel.

In case the microcomputer 304 is informed via the voltage divider 301, 302 of the interruption of the operating voltage, said microcomputer feeds that data to be maintained to the secondary memory 300. For this purpose the capacitor takes over the current supply. When the operating voltage is available again, the microcomputer can again take over the data stored into its internal operating memory. The lamp 308 indicates that the operating voltage had been interrupted. After a predetermined warning time this lamp can be reset automatically or manually by the pushbutton 309.

The FIGS. 15 to 19 show indicators for brake lining and tire pressure supervision which are combined with wheel supervision. Thereby the indicator according to FIG. 15 informs separately about the condition of each wheel and each kind of trouble. The tire pressure is supervised by generators which for each wheel are provided with a unit 315 moving together with the wheel and with a unit 316 which is at rest in respect to the vehicle. The arrangement is only shown for one wheel 317, because the arrangements are completely equal for all wheels. The output signals of the generator for the tire pressure are conducted to the display or control unit 319 via the leads 318.

For supervising the brake lining two contacts 320 and 321 are arranged in the brake lining and insulated from each other. The contact 320 of these contacts is applied to earth. The contact 321 is connected to the display unit 319 via the lead 322. If the brake lining is worn to such an extent that, when the brake is actuated, the two contacts are bridged by the brake drum or brake disc an earth signal comes into being which indicates a too thin brake lining.

The lamps 323 and 324 serve for indication of various troubles, for instance four red ones for tire pressure, four yellow ones for the brake lining. These lamps are arranged on the display unit 319 in line with the four wheels of the vehicle of the present example. In this manner it can be immediately recognised which trouble has occured and which wheel is defective.

Figure 15:
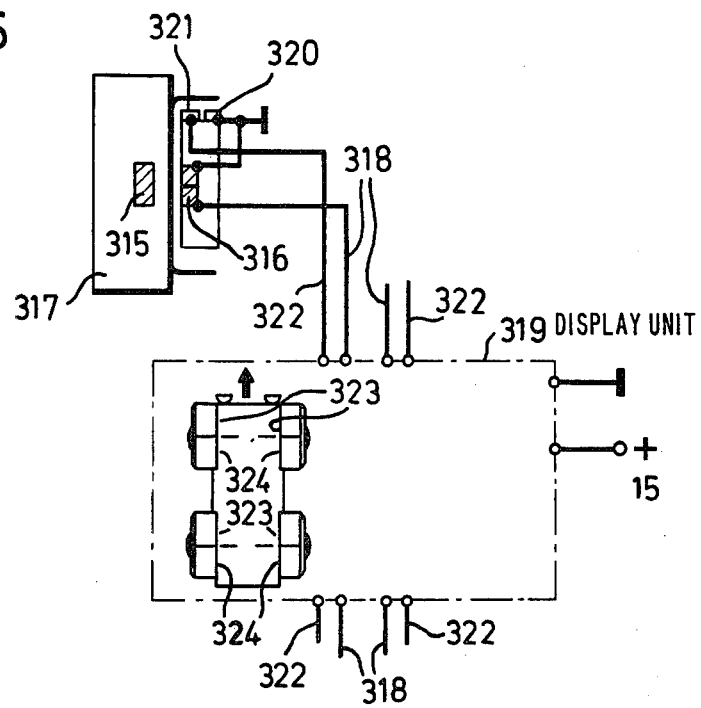
FIG. 15 depicts an indicator for supervising the thickness of the brake lining and of the tire pressure with separate indication for each kind of trouble and for each wheel.
Figure 16:
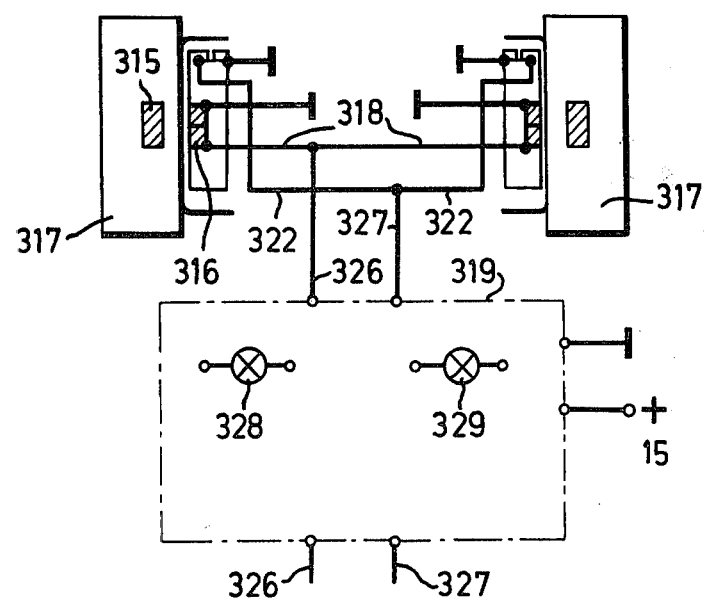
FIG. 16 is an indicator similar to that of FIG. 15, however with only one indication for each kind of trouble.

The indicator shown in FIG. 16 is built up quite similarly to that of FIG. 15. However the lead 318 of the front or rear wheels are connected with each other and conducted to the display unit 319 via a joint lead 326. In the same manner this has been done for the leads 322 for brake lining supervision which are connected to the display unit 319 via the leads 327. In the display unit the leads 326 and 327 each are again connected with each other. The lamp 328, which is controlled via the leads 326, indicates a faulty tire pressure and the lamp 329 a too thin brake lining.

Figure 17:
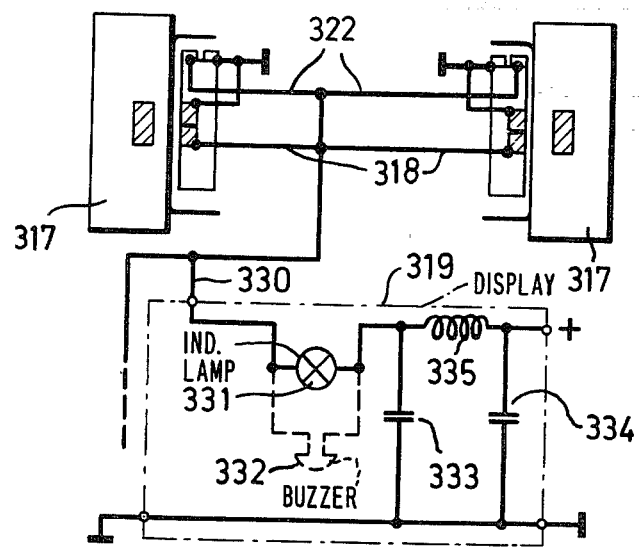
FIG. 17 is an indicator with only a common indication for both kinds of trouble.

In the embodiment according to FIG. 17 all leads 322 and 318 of the various generators on the wheels are interconnected and conducted to the display unit 319 via a single lead 330. Thus the lamp 331 is lighted up, in case the tire pressure or the brake lining thickness on any wheel falls below a given value. A trouble can also be indicated acoustically by a buzzer 332, which is shown by dotted lines and connected in parallel to the lamp which of course can be substituted for a light-emitting diode. The capacitors 333 and 334 and the coil 335 serve for interference suppression.

Figure 18:
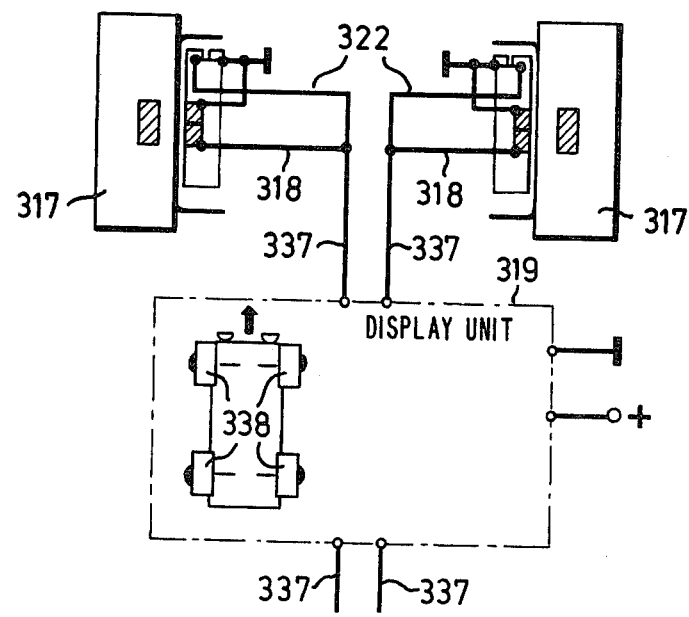
FIG. 18 shows an indicator with one indication each per wheel.

The FIG. 18 shows an embodiment in which for each wheel only one display is available. For this purpose the leads 318 and 322 are interconnected for each wheel. A lead 337 is conducted from each wheel 317 to the display unit 319, where a lamp 338 is assigned to each of them. Similar to FIG. 15, the total of four lamps of FIG. 18 are arranged in such a way that one can easily recognise when a lamp is lighted up and on which wheel the trouble has occured.

In the embodiments described by the FIGS. 15 to 18 a differentiation, whether there is a trouble with the brake lining or the with the tire pressure, is especially made possible in that, when the tire pressure is too low, the appropriate lamp or light-emitting diode is constantly lighted up, whereas the pilot lamp only light up during one braking operation in case the brake lining is too thin. Thus in comparison to the embodiment of FIG. 15 with that of FIG. 18 leads can be saved without affecting the information supplied.

The systems described by the FIGS. 15 to 18 have the disadvantage that they are not self-supervising. When the signal leads are interrupted no trouble can indeed by indicated. It therefore seems as if this trouble would not have arisen at all.

Figure 19:
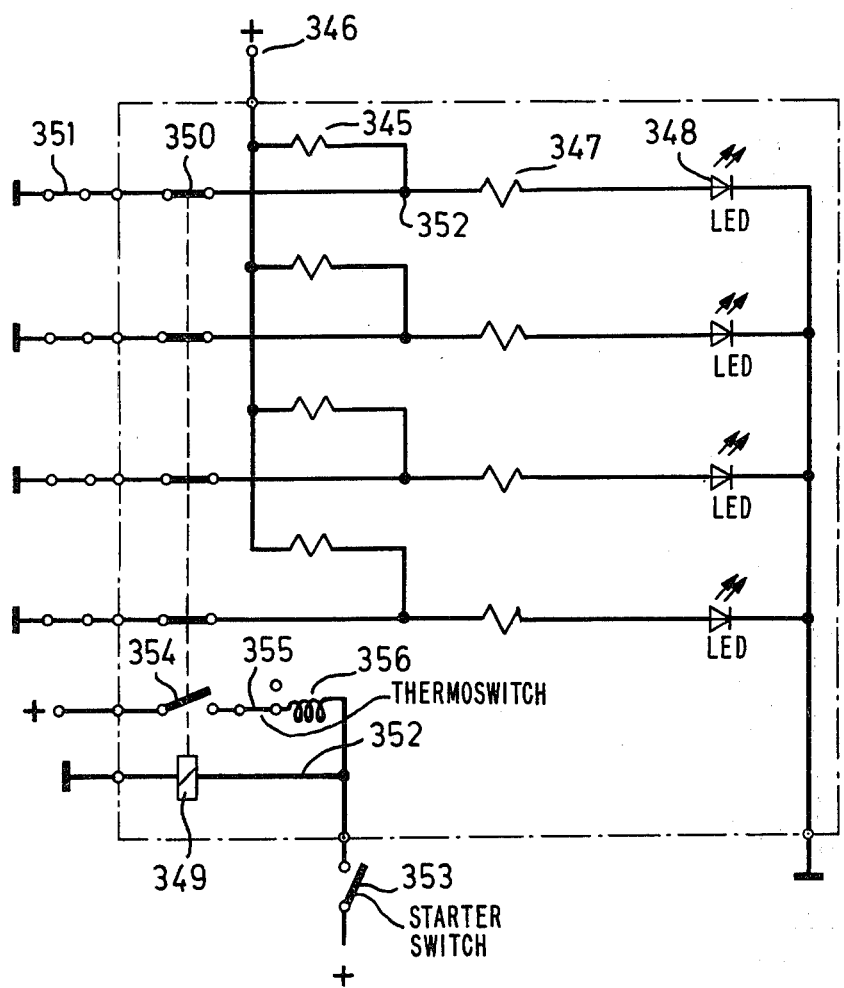
FIG. 19 depicts an indicator monitoring the thickness of the brake linings in self-supervision with indication control.

In constrast thereto a brake lining supervision according to the embodiment of FIG. 19 is self-supervising, that means a pilot lamp is lighted up too, when a signal lead is interrupted, so that the defect can be cured. An additional supervision of the lamps is provided in the version according to FIG. 19.

The electric circuit for a wheel has a resistor 345, which on one side is connected to the positive pole of a voltage source. Behind the resistor 345 there are the series connections on the one hand consisting of resistor 347 and light-emitting diode 348 and on the other hand of a switch 350 operated by a relay 349 and of the wire 351 in the brake lining, whereby these series connections are connected in parallel and to earth. A total of four groups of components for four vehicle wheels are connected in parallel.

In case the brake lining is in order a current flows through the resistor 345, the switch 350 and the wire 351. The diode 348 does not light up, because the junction point 352 is practically applied to earth. If however the brake lining is worn to such an extent, that the brake drum has worn the contact 351, the earth signal is interrupted. Thus positive potential is conducted to the light-emitting diode 348 via the resistors 345 and 347 which lights up and signalises a defective brake lining. The light-emitting diode emits constant light. Only during the braking action by which the contact 351 is bridged does it remain dark.

The switches 350 and the relay coil 349 by which it is actuated belong to a circuit for LED control. The relay coil 349 is connected to earth with its one terminal and to the starter switch 353 with its second terminal via the lead 352. In parallel with the starter switch is the relay contact 354, the thermo-switch 355 and the heating coil heating up the thermo-switch are series connected.

The starter switch 353 and the relay contact 354 are open, when the motor is switched off or running, the switches 350 and the thermo-switch 355 are closed. The relay is not excited, the coil 356 is cold. If one wants to start the motor and actuates the starter switch 353 the relay 349 is supplied with current. The relay operates and opens the switches 350, while the contact 354 is closed. The open switches 350 simulate a defect brake lining, so that the light-emitting diodes are lighted up, if they and their current supply is in order.

As long as the starter switch 353 is closed only a low current flows through the heating source which is not sufficient to heat up the coil sufficiently that the thermo-switch opens 355. If however the starter operation is terminated the current through the heating source becomes so high that the thermo-switch interrupts the current to the relay after about 10 seconds. The relay releases and thereby closes the switches 350, while is opens the contact 354. Therefore the light-emitting diodes go out. If now, after a given cooling-down time the thermo-switch 355 is closed, this does not affect the relay 349. Now the initial condition is reached again.

What is claimed is:

1. An indicating system for presenting a plurality of parameters relating to motor vehicle operation, comprising:

first means having at least two signal generators each providing a signal derived from a corresponding sensor responsive to a discrete physical condition relating to said motor vehicle operation;
second means comprising a display capable of indicating the values of said parameters;
third means for controlling said second means to present said parameters seriatim in a predetermined order in response to at least one initiating signal;
fourth means responsive to the values of said parameters from said first means for initiating a cycle of said third means whenever a predetermined amount of change in value of any of said parameters occurs, said fourth means also including means for manual initiation of a cycle of said third means;
and fifth means comprising circuits for recognizing a value of at least one of said parameters which is outside of a predetermined range indicating a fault and for correspondingly initiating a priority presentation of said parameter corresponding to said fault.

2. Apparatus according to claim 1 in which said fourth means in responsive to closure of the ignition switch of said vehicle and comprises circuits permitting said manual initiation only during said ignition switch closure.

3. Apparatus according to claim 1 in which said fourth means further provides automatic initiation of said cycle upon closure of said ignition switch.

4. Apparatus according to claim 1 in which said third means comprises at least one electronic gate in series with the path between each of said first means signals and said display and a counter controlled by a clock pulse generator, said counter providing a discrete output for controlling each of said gates seriatim.

5. Apparatus according to claim 1 in which sixth means are provided and are associated with said first means, for inhibiting the presentation of at least one of said parameters until expiration of a predetermined delay, thereby to avoid presentation of initially false indications from parameters which subsequently stabilize.

6. Apparatus according to claim 1 in which seventh means associated with said third means are included for establishing said predetermined order of presentation of said parameters according to priority significance of each of the output signals of said first means.

7. Apparatus according to claim 1 in which eighth means are included associated with said fifth means for applying said order of presentation to a plurality of said parameters corresponding to faults in their respective vehicle functions.

8. Apparatus according to claim 4 further including means for blocking said clock pulse signal from said counter during said fault indicating parameter to provide continuous presentation of said fault parameter until said cycle is intentionally re-initiated.

9. Apparatus according to claim 1 in which said first means signals are digitized for digital processing on said display, said display being of the multi-digit, seven bar, LED type.

10. Apparatus according to claim 4 in which said first means signals are digitized for digital processing on said display, said display being of the multi-digit, seven bar, LED type.

* * * * *